(12) United States Patent
York, III (10) Patent No.: US 12,546,357 B2
(45) Date of Patent: Feb. 10, 2026

(54) BREAKAWAY THREADED FASTENERS

(71) Applicant: Hubbell Incorporated, Shelton, CT (US)

(72) Inventor: Charles L York, III, Bow, NH (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 18/295,426

(22) Filed: Apr. 4, 2023

(65) Prior Publication Data

US 2023/0323912 A1 Oct. 12, 2023

Related U.S. Application Data

(60) Provisional application No. 63/328,667, filed on Apr. 7, 2022.

(51) Int. Cl.
| | |
|---|---|
| *F16B 31/00* | (2006.01) |
| *F16B 31/02* | (2006.01) |
| *F16B 35/04* | (2006.01) |

(52) U.S. Cl.
CPC .......... *F16B 31/021* (2013.01); *F16B 35/045* (2013.01)

(58) Field of Classification Search
CPC .............................. F16B 35/045; F16B 31/021
USPC ............................................................ 411/2
See application file for complete search history.

(56) References Cited

U.S. PATENT DOCUMENTS

| | | | |
|---|---|---|---|
| 3,468,211 A | | 9/1969 | Suan |
| 5,201,914 A | | 4/1993 | Hollick |
| 5,256,015 A | * | 10/1993 | St. Clair ............... F16B 31/021 |
| | | | 411/4 |
| 5,810,502 A | * | 9/1998 | Reitz ....................... F16B 9/056 |
| | | | 403/230 |
| 6,209,424 B1 | | 4/2001 | Croton et al. |
| 6,791,465 B2 | * | 9/2004 | Blagin .................. F16B 41/005 |
| | | | 73/761 |
| 6,935,267 B1 | * | 8/2005 | Cotton .................. B63B 25/082 |
| | | | 114/364 |
| 7,214,108 B2 | | 5/2007 | Barnett |
| 7,717,658 B2 | | 5/2010 | Peltier |

(Continued)

FOREIGN PATENT DOCUMENTS

| | | |
|---|---|---|
| DE | 10234475 | 1/2004 |
| DE | 102012013176 | 1/2014 |

(Continued)

*Primary Examiner* — Christine M Mills
*Assistant Examiner* — Dil K. Magar
(74) *Attorney, Agent, or Firm* — Ruggiero McAllister & McMahon LLC; Edward L McMahon (57) ABSTRACT

A breakaway threaded fastener is provided that includes a hollow stud, a pin, and a cap. The stud has a hollow cavity, a closed end, an open end with an upper surface, a wall, and an outer surface, which includes an external thread. The pin is in the hollow cavity with a first end at the closed end of the hollow stud and a second end proximate the open end of the hollow stud. The cap has another hollow cavity with a closed end, an open end, an inner surface, and an internal thread. The cap is threadably engaged to the open end of the hollow stud via the internal and external threads so that the second end of the pin abuts the inner surface of the cap with a gap remaining between the upper surface of the hollow stud and the inner surface of the cap.

20 Claims, 8 Drawing Sheets

(56) References Cited

U.S. PATENT DOCUMENTS

| | | | |
|---|---|---|---|
| 7,973,671 B2 * | 7/2011 | Cloutier | F16B 31/021 |
| | | | 340/687 |
| 8,057,145 B2 | 11/2011 | Dolan | |
| 8,550,842 B1 | 10/2013 | Gutiérrez | |
| 8,668,419 B2 * | 3/2014 | Hardt | H01R 4/307 |
| | | | 411/5 |
| 9,472,865 B2 | 10/2016 | Frank | |
| 10,760,608 B2 | 9/2020 | Diniz | |
| 11,276,946 B2 | 3/2022 | Newman | |
| 11,326,639 B1 | 5/2022 | Juillet | |
| 2007/0253792 A1 | 11/2007 | Zahnen et al. | |
| 2008/0066901 A1 | 3/2008 | Gereluk | |
| 2013/0101369 A1 * | 4/2013 | Lenoir | F16B 37/0807 |
| | | | 411/2 |
| 2014/0033494 A1 * | 2/2014 | O'Sullivan | F16B 31/00 |
| | | | 411/5 |
| 2014/0322990 A1 | 10/2014 | Umlauf | |
| 2015/0071728 A1 | 3/2015 | Vallette et al. | |
| 2015/0155640 A1 | 6/2015 | Frank | |
| 2016/0104952 A1 * | 4/2016 | Beck | H01R 4/366 |
| | | | 439/814 |
| 2016/0160902 A1 | 6/2016 | Tamm et al. | |
| 2016/0346715 A1 * | 12/2016 | Koonce | B01D 35/30 |
| 2019/0165498 A1 * | 5/2019 | Saeed | F16B 31/021 |
| 2021/0190621 A1 * | 6/2021 | Chou | G01L 19/0618 |
| 2021/0310511 A1 * | 10/2021 | Saeed | F16B 31/00 |
| 2022/0145923 A1 | 5/2022 | Dossmann | |
| 2022/0196062 A1 | 6/2022 | Dossmann | |
| 2023/0323912 A1 | 10/2023 | York | |

FOREIGN PATENT DOCUMENTS

| | | |
|---|---|---|
| DE | 102015102224 | 8/2016 |
| EP | 1460278 | 9/2005 |
| EP | 1626187 | 12/2009 |
| EP | 2487755 | 8/2012 |
| EP | 2657548 | 10/2013 |
| EP | 3388696 | 10/2018 |
| GB | 1411151 | 10/1975 |
| RU | 2028702 | 2/1995 |
| WO | 2021202083 | 10/2021 |

* cited by examiner

BREAKAWAY THREADED FASTENERS

CROSS REFERENCE TO RELATED APPLICATIONS

This application claims the benefit of U.S. Provisional Application No. 63/328,667 filed Apr. 7, 2022, the entire contents of which are incorporated herein by reference.

BACKGROUND

1. Field of the Invention

The present disclosure is related to threaded fasteners. More particularly, the present disclosure is related to breakaway threaded fasteners and electrical connectors having such fasteners.

2. Description of Related Art

Electrical connectors are commonly used to make an electrical and mechanical connection to an electrical conductor. In some instances, the mechanical and electrical connection is maintained using one or more threaded fasteners. Moreover, it is known to use threaded fasteners that have one or more portions that breakaway after securing the electrical conductor in the electrical connector.

However, it has been determined by the present disclosure that many prior art breakaway threaded fasteners are overly complex leading to one or more of an increased cost of manufacture, an increased difficulty in use, a need for special tools during use, and increased failure modes.

Accordingly, it has been determined by the present disclosure that is a continuing need for breakaway threaded connectors that overcome, alleviate, and/or mitigate one or more of the aforementioned and other deleterious effects of the prior art.

A breakaway threaded fastener is provided that includes a hollow stud, a pin, and a cap. The stud has a hollow cavity, a closed end, an open end with an upper surface, a wall, and an outer surface, which includes an external thread. The pin is in the hollow cavity with a first end at the closed end of the hollow stud and a second end proximate the open end of the hollow stud. The cap has another hollow cavity with a closed end, an open end, an inner surface, and an internal thread. The cap is threadably engaged to the open end of the hollow stud via the internal and external threads so that the second end of the pin abuts the inner surface of the cap with a gap remaining between the upper surface of the hollow stud and the inner surface of the cap.

In some embodiments either alone or together with any one or more of the aforementioned and/or after-mentioned embodiments, the internal and external threads and the gap are configured so that the cap rotates no more than ¼ turn with respect to the hollow stud after contact between the top end of the pin and the bottom surface of the cap.

In some embodiments either alone or together with any one or more of the aforementioned and/or after-mentioned embodiments, the internal and external threads and the gap are configured so that, when the external thread of the hollow stud is threaded into a threaded bore, an application of torque to the cap results in a tensile stress being applied to the hollow stud through the pin until the gap is closed and the upper surface of the hollow stud contacts the inner surface of the cap.

In some embodiments either alone or together with any one or more of the aforementioned and/or after-mentioned embodiments, the tensile stress is lower than a rupture stress of the hollow stud.

In some embodiments either alone or together with any one or more of the aforementioned and/or after-mentioned embodiments, the internal and external threads and the gap are configured so that an application of torque to the cap after the gap is closed results in a shear stress being applied to the hollow stud.

In some embodiments either alone or together with any one or more of the aforementioned and/or after-mentioned embodiments, the hollow stud is configured to fracture under a combination of the tensile and shear stresses at an uppermost engaged thread of the external thread.

In some embodiments either alone or together with any one or more of the aforementioned and/or after-mentioned embodiments, the fastener further includes a contact plane defined through where the second end of the pin abuts the inner surface of the cap.

In some embodiments either alone or together with any one or more of the aforementioned and/or after-mentioned embodiments, the contact plane is above or below the upper surface of the hollow stud.

In some embodiments either alone or together with any one or more of the aforementioned and/or after-mentioned embodiments, the second end of the pin is secured to the inner surface of the cap.

In some embodiments either alone or together with any one or more of the aforementioned and/or after-mentioned embodiments, the second end of the pin extends above or is below the upper surface of the hollow stud.

In some embodiments either alone or together with any one or more of the aforementioned and/or after-mentioned embodiments, the external thread extends between the open and closed ends of the hollow stud.

In some embodiments either alone or together with any one or more of the aforementioned and/or after-mentioned embodiments, the cap includes an external torque application feature.

In some embodiments either alone or together with any one or more of the aforementioned and/or after-mentioned embodiments, the external torque application feature is a shape selected from a group consisting of a hexagonal outer nut, a square nut, hexalobular nut, and a 12-point drive.

In some embodiments either alone or together with any one or more of the aforementioned and/or after-mentioned embodiments, the hollow stud includes an internal torque application feature in the closed end within the hollow stud.

In some embodiments either alone or together with any one or more of the aforementioned and/or after-mentioned embodiments, the internal torque application feature is a shape selected from a group consisting of a hexagonal opening, a square opening, hexalobular opening, and a 12-point opening.

In some embodiments either alone or together with any one or more of the aforementioned and/or after-mentioned embodiments, the hollow stud, pin, and cap are made of electrically conductive materials and/or are made of the same material or different materials.

In some embodiments either alone or together with any one or more of the aforementioned and/or after-mentioned embodiments, the fastener has an appearance of a normal hexagonal head bolt.

In some embodiments either alone or together with any one or more of the aforementioned and/or after-mentioned embodiments, the hollow stud has a partial taper, where the partial taper is offset from the open end of the cap and runs to the closed end of the hollow stud.

In some embodiments either alone or together with any one or more of the aforementioned and/or after-mentioned embodiments, the hollow stud has a full taper, where the full taper runs from the open end of the cap to the closed end of the hollow stud.

In some embodiments either alone or together with any one or more of the aforementioned and/or after-mentioned embodiments, the hollow stud has a constant thickness from the open end of the cap to the closed end of the hollow stud.

The above-described and other features and advantages of the present disclosure will be appreciated and understood by those skilled in the art from the following detailed description, drawings, and appended claims.

DETAILED DESCRIPTION

Referring to the drawings and in particular with simultaneous reference to FIGS. 1-6, an exemplary embodiment of a breakaway threaded fastener according to the present disclosure is shown and is generally referred to by reference numeral 10. Advantageously, fastener 10 is a breakaway fastener that has a simple, easy to manufacture, assemble, and use construction. Fastener 10 includes a hollow stud 12, a pin 14, and a cap 16.

Hollow stud 12 is a hollow cylinder having a wall 18, an open end 20, a closed end 22 with a top surface 24, and an exterior thread 26 extending along a longitudinal axis 28. In some embodiments, thread 26 extends from open end 20 to closed end 22 while in other embodiments thread 26 is only along portions of hollow stud 12. Moreover, thread 26 can have different attributes (e.g., pitch, thread depth, etc.) in different areas of hollow stud 12.

Hollow stud 12 is particularly configured to breakaway at a desired location under a combined stress resulting from both tensile or axial stresses along axis 28 and shear stresses about the axis. Surprisingly, the present application has determined that the combined stress at which hollow stud 12 fails has been found to be particularly sensitive to a gap 30 (FIG. 3) between hollow stud 12 and cap 16 as described in detail herein below.

Pin 14 has a bottom end 32, a top end 34, and a length 36 along the axis 28. Moreover, pin 14 is configured and sized to fit within hollow stud 12 and within cap 16. For example, pin 14 has an outer dimension that fits in inside an inner dimension of the hollow stud and inside an inside dimension of cap 16.

Cap 16 is also a hollow cylinder that has an open end 38, a closed end 40, an internal thread 42 extending along axis 28, and a bottom surface 44. Thus, hollow stud 12 and cap 16 are configured to be threadably engaged to one another via threads 26, 42, respectively.

Figure 1:
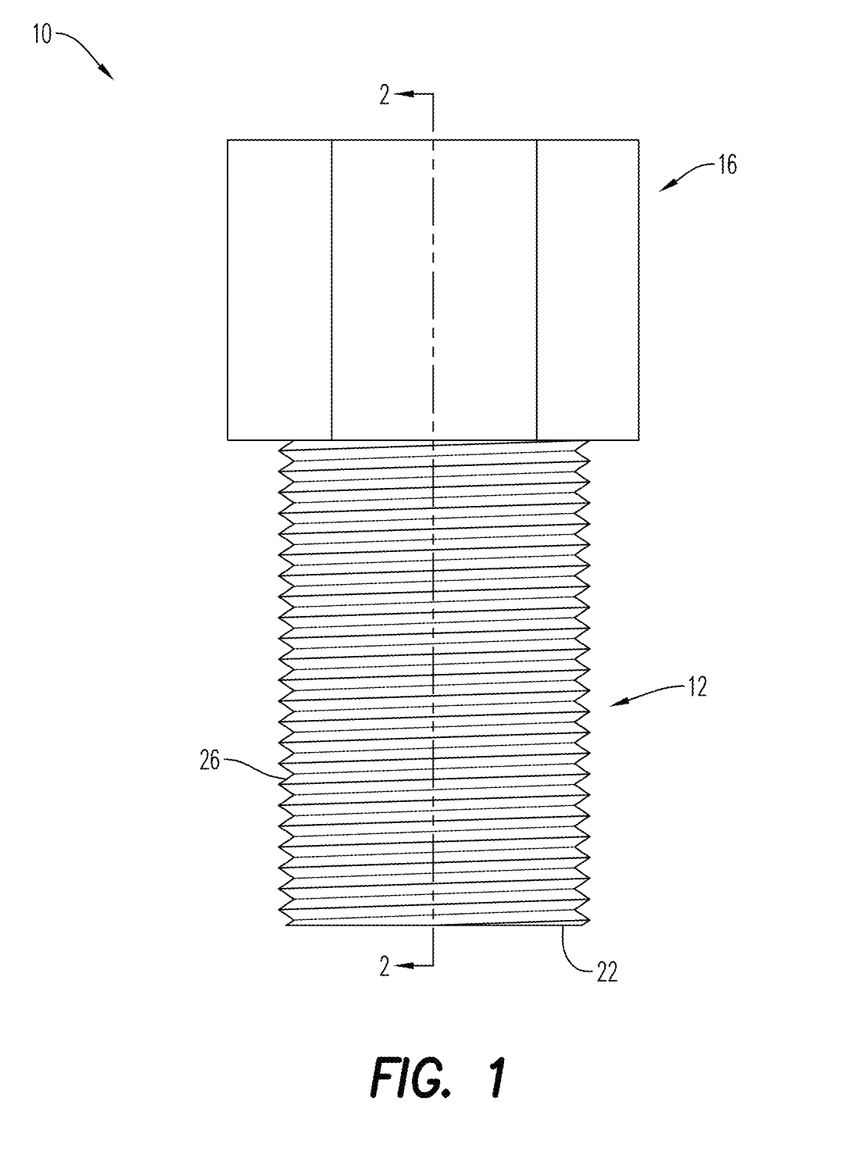
FIG. 1 is a perspective view of an exemplary embodiment of a breakaway threaded fastener according to the present disclosure.
Figure 2:
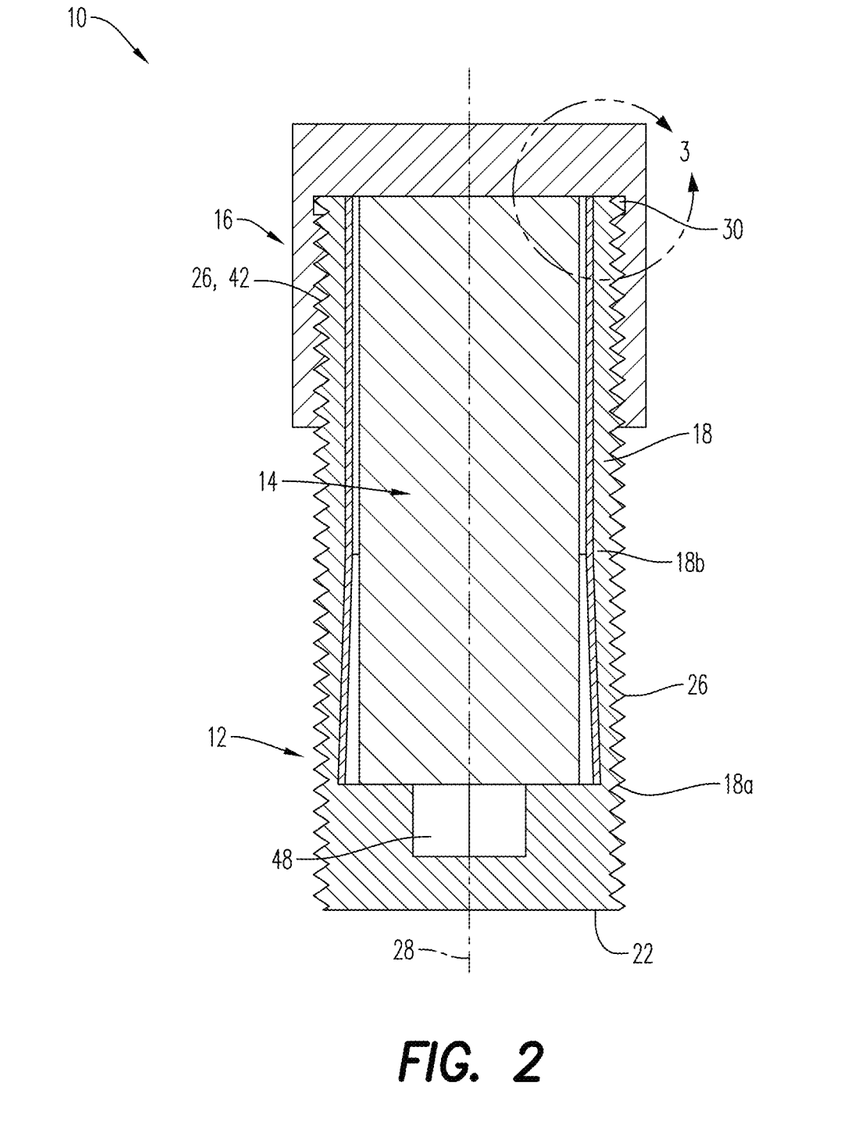
FIG. 2 is a sectional view of the fastener of FIG. 1 taken along line 2-2.
Figure 3:
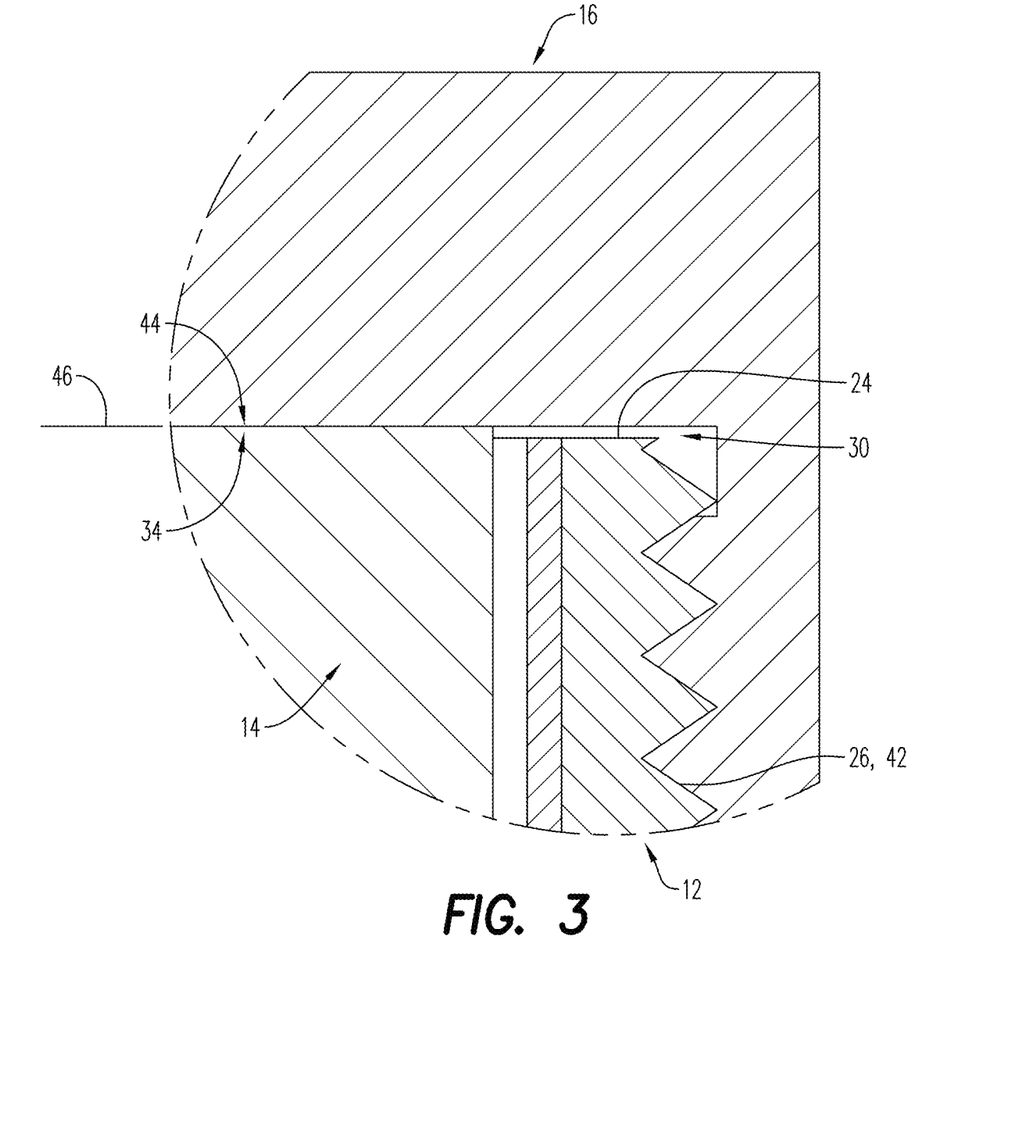
FIG. 3 is an enlarged view of the fastener of FIG. 2 taken at circle 3.
Figure 4:
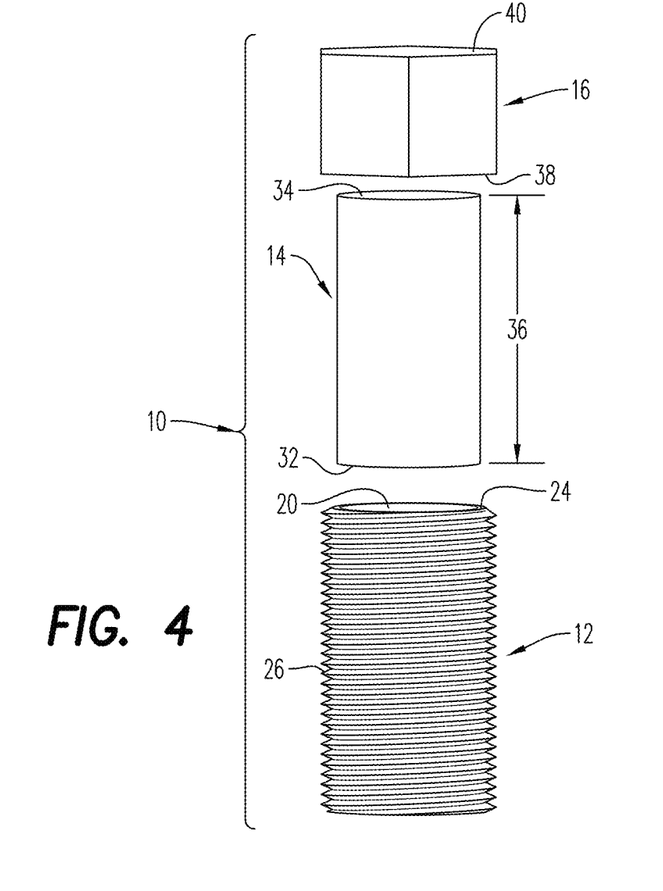
FIG. 4 is an exploded view of the fastener of FIG. 1.
Figure 5:
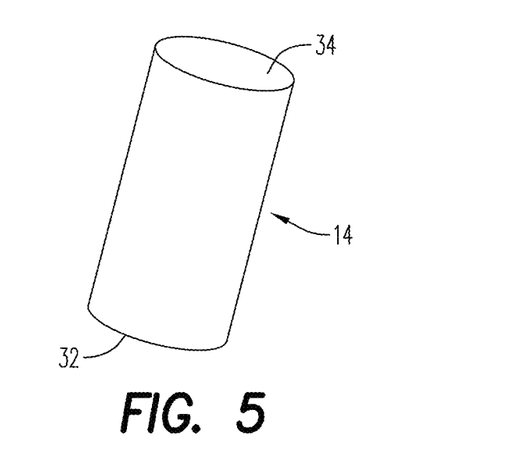
FIG. 5 is a perspective view of an exemplary embodiment of a pin of the fastener of FIG. 1.

To assemble fastener 10, pin 14 is dropped into hollow stud 12 so that bottom end 32 of the pin rests on closed end 22 of hollow stud 12. Then, cap 16 is threaded onto open end 20 of hollow stud 12 via threads 26, 42. In this manner, cap 16 covers open end 20 of hollow stud 12—with pin 14 inside the hollow stud-to provide fastener 10 with the appearance of a normal bolt. For example, in embodiments where cap 16 is configured as having an external torque application feature—such as, but not limited to a hexagonal outer nut, fastener 10 takes on the appearance of a normal hexagonal bolt as shown in FIG. 1.

It should be recognized that cap 16 is shown configured as a hexagonal outer nut—that mates with known wrenches, sockets, and the like. Of course, it is contemplated by the present disclosure to for cap 16 to be configured with any desired shape sufficient to apply torque to fastener 10 via the cap such as, but not limited to a hexagonal outer nut, a square nut, hexalobular nut, a 12-point drive, and others.

Advantageously, 14 and cap 16 are configured to define gap 30 between top surface 24 of hollow stud 12 and bottom surface 44 of cap 16. The present application contemplates forming gap 30 in a number of different ways.

Fastener 10 finds use, for example, with electrical connectors such as those disclosed in Applicant's own US Publication 2021/0310511A1, the entire contents of which are incorporated herein by reference. Advantageously, fastener 10 having gap 30 has been found by the present disclosure to provide a more controlled fracture/breakaway of hollow stud 12 that previously possible.

In the embodiment illustrated in FIGS. 1-5, gap 30 is formed by configuring pin 14 with length 36 such that, when the pin is positioned in hollow stud 12, top end 34 of the pin extends above top surface 24 of hollow stud 12. In this manner, gap 30 is defined as the distance remaining between surfaces 24, 44 when cap 16 is threaded onto 12 stud until top end 34 of the pin 14 contacts bottom surface 44 of the cap 16. Stated differently, fastener 10 can be configured so that top end 34 and bottom surface 44 define a contact plane 46 that is spaced above top surface 24 of hollow stud 12 to define gap 30.

Figure 6:
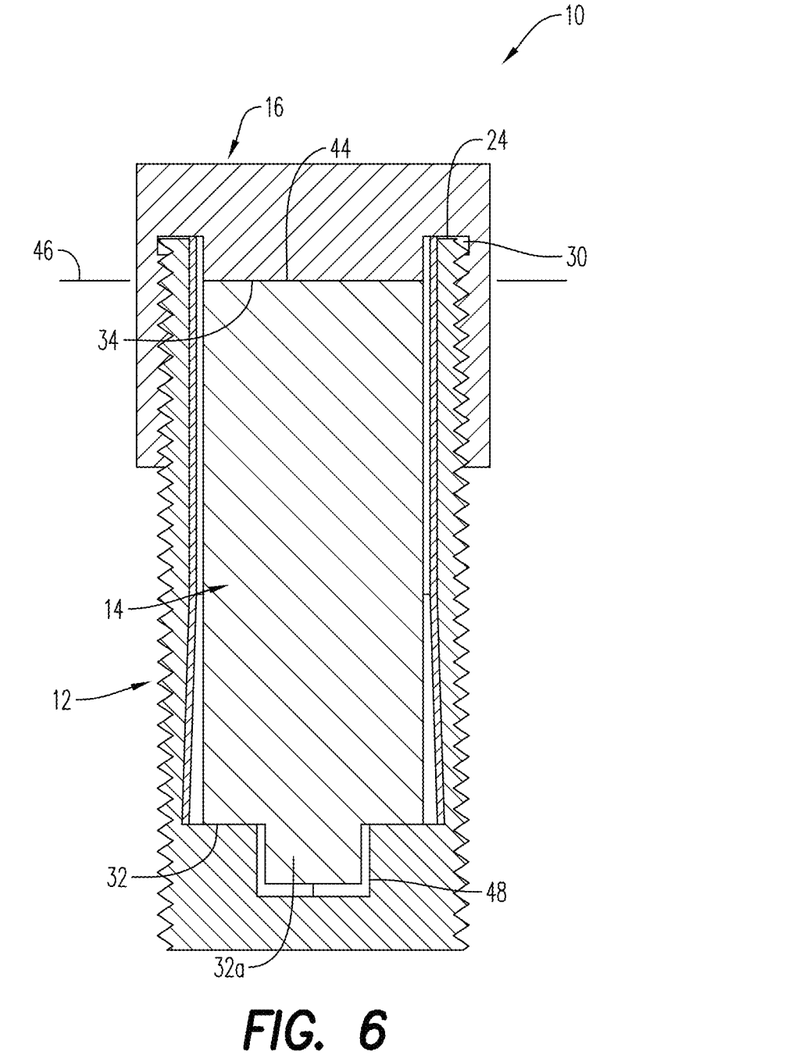
FIG. 6 is a sectional view of an alternate exemplary embodiment of the fastener of FIG. 1.

Of course, it is contemplated by the present disclosure for the components of fastener 10 to have other configurations that provide gap 30. For example, fastener 10 is shown in FIG. 6 where cap 16 is configured so that bottom surface 44 extends from the cap and pin 14 is configured with length 36 such that, when the pin is positioned in hollow stud 12, a top end 34 of the pin remains below top surface 24 of hollow stud 12. Here, fastener 10 is configured so that top end 34 and bottom surface 44 define a contact plane 46 that is spaced below top surface 24 of hollow stud 12 to define gap 30.

In some embodiments, pin 14 and cap 16 are connected to one another at contact plane 46 such that, after hollow stud 12 breaks or ruptures, the cap, pin, and ruptured portion of the hollow stud form a unitary component that can be easily discarded.

During use, fastener 10 is configured so that application of torque to cap 16 results in the cap—due to gap 30—placing pin 14 in compression, which places hollow stud 12 under tension along axis 28—without fracturing the hollow stud. Continuing to apply torque to cap 16 then results in hollow stud 12 being further placed under shear—until the hollow stud fails or fractures due to the combination of tension and shear.

As noted above, the present application has determined that controlling the size of gap 30 is important in ensuring that hollow stud 12 does not prematurely fail or breakaway due to tension only, while still ensuring that the hollow stud fails at the desired location in thread 26 under both tension and shear.

In this manner, when external thread 26 at closed end 22 of hollow stud 12 is received into a threaded bore (not shown), application of torque to cap 16 first results in pin 14 applying a tensile stress that on the hollow stud between the cap and an upper most portion of the thread 26 that is engaged in the threaded bore. The continued application of torque to cap 16 rotates fastener 10 into the threaded bore until the torque provides additional shear stresses to the already present tensile stress until the hollow stud breaks away or ruptures—under the combined tensile and shear stresses at the uppermost engaged thread 26.

Fastener 10 is configured so that the tensile stress applied to hollow stud 12 is limited by the gap 30. Specifically, gap 30 is dimensioned so that cap 16 can rotate no more than ¼ turn with respect to hollow stud 12 after contact between top end 34 of pin 14 and bottom surface 44 of the cap.

Stated differently, fastener 10 is configured so that gap 30 is based on a multiple of the thread pitch so to limit linear displacement—and thus tensile stress—before bottom surface 44 of cap 16 contacts top surface 24 of hollow stud 12.

Hollow stud 12 can be configured so that wall 18 has a thickness—at least in regions that is thin enough to fail under tension as will be described in more detail herein. Various embodiments of hollow stud 12 are disclosed with reference to FIGS. 7-9.

Figure 7:
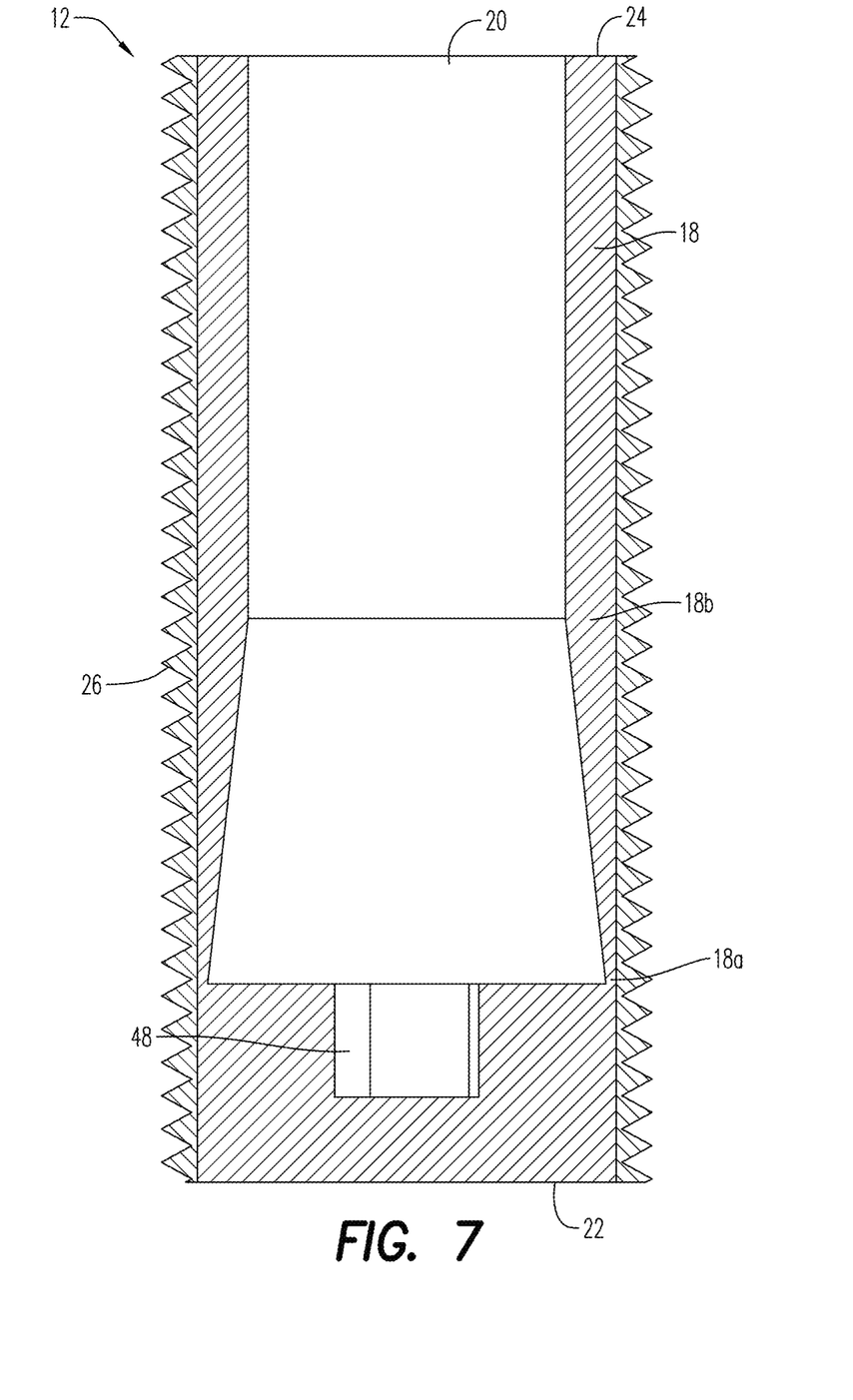
FIG. 7 is a sectional view of an exemplary embodiment of a stud of the fastener of FIG. 1.

In the embodiment illustrated in FIGS. 1-7 and best seen in FIG. 7, hollow stud 12 is configured so that wall 18 has a minimal thickness 18a is the result of a partial taper on an inner surface of the wall 18. Here, wall 18 has a common thickness from open end 20 to a transition point 18b—where the thickness of the wall decreases or tapers to minimal thickness 18a, which is proximate closed end 22. Thus, hollow stud 12 is configured in this embodiment with a partial taper.

EXAMPLE

The axial load on hollow stud 12 with partial taper 18b that results from torque sufficient to close gap 30 is shown below. Here, it can be seen that the gap 30 prevents the axial or tensile loads applied to hollow stud 12 from exceeding the yield or ultimate tensile stresses of the hollow stud such that fastener 10 ensures rupture occurs from a combination of the tensile and shear stresses on the hollow stud and, not just tensile stresses.

| Material of Hollow stud 12 | Ultimate Tensile Stress (ksi) | Yield Stress (ksi) | Thread pitch | Starting distance of gap 30 | Approximate axial stress at gap of 0 mm (ksi) |
|---|---|---|---|---|---|
| 6061-T6 Aluminum | 45 | 39 | 1.50 mm | 0.19 mm | 12 to 28 |

It should be recognized that the values provided above are provided for a specific set of parameters—including materials, thicknesses, thread characteristics, and others. Of course, it is contemplated by the present disclosure for fastener 10 to have any desired configuration such that the failure of hollow stud 12 occurs as a result of a combination of the tensile stress and the shear stress.

Figure 8:
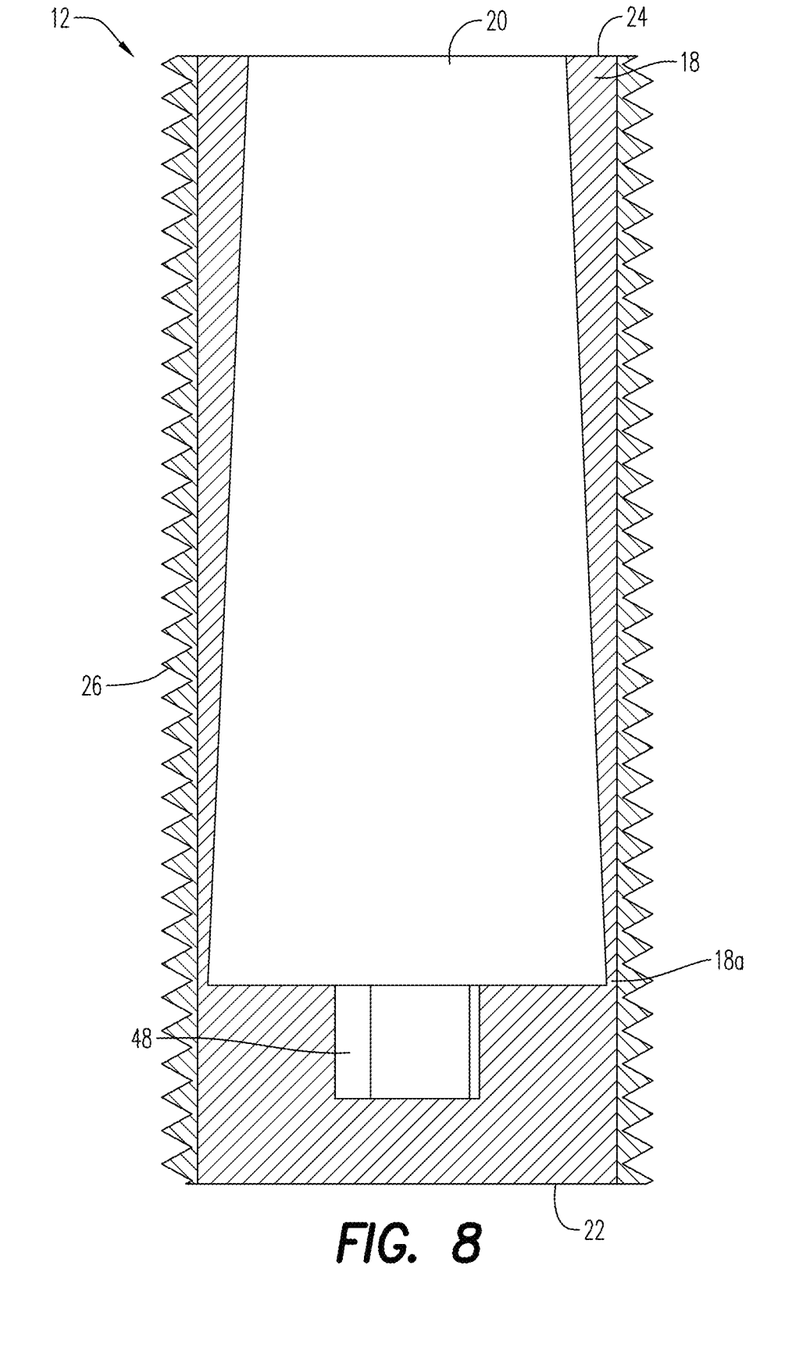
FIGS. 8-9 are sectional views of alternate exemplary embodiments of studs of the fastener of FIG. 1.

In the embodiment illustrated in FIG. 8, hollow stud 12 is configured so that wall 18 has a minimal thickness 18a is the result of a full taper on an inner surface of the wall 18. Here, wall 18 has a maximum thickness at open end 20 and the thickness of the wall decreases or tapers to minimal thickness 18a, which is proximate closed end 22. Thus, hollow stud 12 is configured in this embodiment with a full taper.

Of course, it is contemplated by the present disclosure for hollow stud 12 to be configured with a minimal thickness formed by thinning a region of wall 18 from the inner surface of hollow stud 12 and/or from an exterior surface of the hollow stud.

Further, it is contemplated by the present disclosure for hollow stud 12 to be configured with a weakened area defined by one or more holes into the wall from the inner surface of hollow stud 12 and/or from an exterior surface of the hollow stud.

Figure 9:
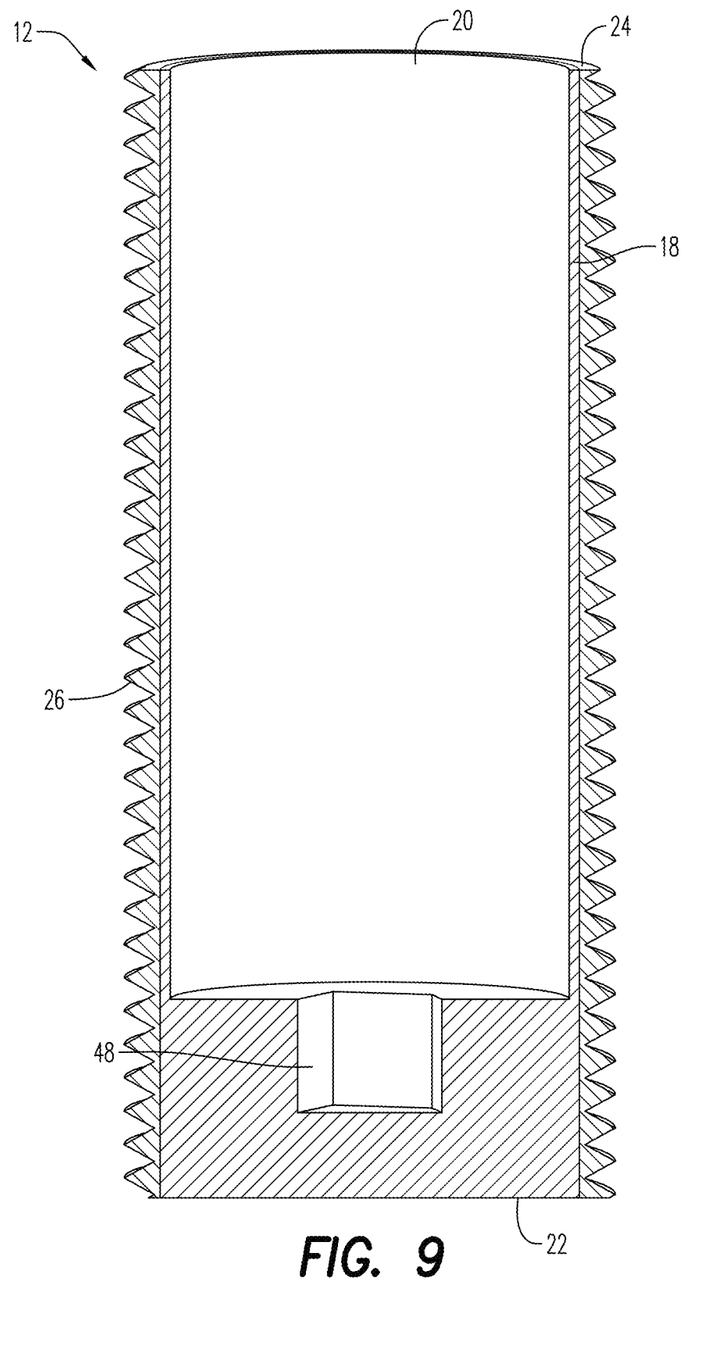

In the embodiment of FIG. 9, hollow stud 12 is configured such that wall 18 has a common or constant thickness, as reduced by thread 28, along axis 28. Here, wall 18 lacks any additional feature or structure that defines a weak point for fracture.

Fastener 10, namely hollow stud 12, pin 14, and cap 16, can be made of any desired material. It is contemplated for hollow stud 12, pin 14, and cap 16 to be made of the same material or different materials. In some embodiments, fastener 10 can be made of electrically conductive material having sufficient strength for hollow stud 12 to threadably fasten different threaded bores.

In some embodiments, fastener 10 is made of aluminum or aluminum alloys. In one particular embodiment, hollow stud 12 and cap 16 are made of different alloys—with stud being softer than cap to avoid or mitigate galling during engagement of threads 26, 42. For example, hollow stud 12 can be made of a T6061 aluminum alloy and cap 16 can be made of a T2011 aluminum alloy.

In some embodiments, hollow stud 12 is configured such that closed end 22 includes an internal torque application feature 48—illustrated by way of example as a hex opening. Feature 48 allows for application of a removal torque to hollow stud 12 after installation in a threaded opening and after a portion of the hollow stud has broken away together with pin 14 and cap 16. It should be recognized that fastener 10 is contemplated by the present disclosure to include hollow stud 12 with feature 48 of any desired configuration sufficient to apply torque to the fastener such as, but not limited to, hexagonal opening, a square opening, hexalobular opening, a 12-point opening, and others.

In some embodiments, pin 14 has an outer dimension that is larger than an outer dimension of feature 48 so that the pin does not fit into the feature. In other embodiments, pin 14 can be configured with a complimentary feature 32a (FIG. 6) extending from bottom end 32, where feature 32a is sized and/or shaped to be received in feature 48. In this manner, the mating of features 32a, 48 can further ensure a centering of pin 14 in hollow stud 48.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

PARTS LIST

| | |
|---|---|
| fastener 10 | longitudinal axis 28 |
| hollow stud 12 | gap 30 |
| pin 14 | bottom end 32 |
| cap 16 | complimentary feature 32a |
| wall 18 | top end 34 |
| minimal thickness 18a | length 36 |
| transition point 18b | open end 38 |
| open end 20 | closed end 40 |
| closed end 22 | internal thread 42 |
| top surface 24 | bottom surface 44 |
| exterior thread 26 | contact plane 46 |
| | feature 48 |

What is claimed is:

1. A breakaway threaded fastener, comprising:
   a hollow stud having hollow cavity, a closed end, an open end with an upper surface, a wall, and an outer surface, the outer surface having an external thread;
   a pin in the hollow cavity, the pin having a first end at the closed end of the hollow stud and a second end proximate the open end of the hollow stud; and
   a cap having another hollow cavity with a closed end, an open end, an inner surface, and an internal thread,
   the cap being threadably engaged to the open end of the hollow stud via the internal and external threads so that the second end of the pin abuts the inner surface of the cap with a gap remaining between the upper surface of the hollow stud and the inner surface of the cap,
   wherein the internal and external threads and the gap are configured so that the cap rotates no more than ¼ turn with respect to the hollow stud after contact between the top end of the pin and the bottom surface of the cap.

2. The breakaway threaded fastener of claim 1, wherein the internal and external threads and the gap are configured so that, when the external thread of the hollow stud is threaded into a threaded bore, an application of torque to the cap results in a tensile stress being applied to the hollow stud through the pin until the gap is closed and the upper surface of the hollow stud contacts the inner surface of the cap.

3. The breakaway threaded fastener of claim 2, wherein the tensile stress is lower than a rupture stress of the hollow stud.

4. The breakaway threaded fastener of claim 2, wherein the internal and external threads and the gap are configured so that an application of torque to the cap after the gap is closed results in a shear stress being applied to the hollow stud.

5. The breakaway threaded fastener of claim 4, wherein the hollow stud is configured to fracture under a combination of the tensile and shear stresses at an uppermost engaged thread of the external thread.

6. The breakaway threaded fastener of claim 1, further comprising a contact plane defined through where the second end of the pin abuts the inner surface of the cap.

7. The breakaway threaded fastener of claim 6, wherein the contact plane is above or below the upper surface of the hollow stud.

8. The breakaway threaded fastener of claim 1, wherein the second end of the pin is secured to the inner surface of the cap.

9. The breakaway threaded fastener of claim 1, wherein the second end of the pin extends above or is below the upper surface of the hollow stud.

10. The breakaway threaded fastener of claim 1, wherein the external thread extends between the open and closed ends of the hollow stud.

11. The breakaway threaded fastener of claim 1, wherein the cap comprises an external torque application feature.

12. The breakaway threaded fastener of claim 11, wherein the external torque application feature comprises a shape selected from a group consisting of a hexagonal outer nut, a square nut, hexalobular nut, and a 12-point drive.

13. The breakaway threaded fastener of claim 1, wherein the hollow stud comprises an internal torque application feature in the closed end within the hollow stud.

14. The breakaway threaded fastener of claim 13, wherein the internal torque application feature comprises a shape selected from a group consisting of a hexagonal opening, a square opening, hexalobular opening, and a 12-point opening.

15. The breakaway threaded fastener of claim 1, wherein the hollow stud, pin, and cap are made of electrically conductive materials and/or are made of the same material or different materials.

16. The breakaway threaded fastener of claim 1, wherein the fastener has an appearance of a normal hexagonal head bolt.

17. The breakaway threaded fastener of claim 1, wherein the hollow stud comprises a partial taper, wherein the partial taper is offset from the open end of the cap and runs to the closed end of the hollow stud.

18. The breakaway threaded fastener of claim 1, wherein the hollow stud comprises a full taper, wherein the full taper runs from the open end of the cap to the closed end of the hollow stud.

19. The breakaway threaded fastener of claim 1, wherein the hollow stud comprises a constant thickness from the open end of the cap to the closed end of the hollow stud.

20. A breakaway threaded fastener, comprising:
   a hollow stud having hollow cavity, a closed end, an open end with an upper surface, a wall, and an outer surface, the outer surface having an external thread;
   a pin in the hollow cavity, the pin having a first end at the closed end of the hollow stud and a second end at the open end of the hollow stud, the second end being below the upper surface of the hollow stud;
   a cap having another hollow cavity with a closed end, an open end, an inner surface, and an internal thread, the cap being threadably engaged to the open end of the hollow stud via the internal and external threads so that the second end of the pin abuts the inner surface of the cap at a contact plane that is below the upper surface of the hollow stud.

* * * * *